Oct. 9, 1951

H. G. BUSIGNIES 2,570,203

DISTANCE FINDING SYSTEM WITH MEANS
TO ELIMINATE SELECTED INDICATIONS

Filed March 5, 1941

INVENTOR.
HENRI G. BUSIGNIES
BY
ATTORNEY

INVENTOR.
HENRI G. BUSIGNIES
BY
ATTORNEY.

Patented Oct. 9, 1951

2,570,203

UNITED STATES PATENT OFFICE

2,570,203

DISTANCE FINDING SYSTEM WITH MEANS TO ELIMINATE SELECTED INDICATIONS

Henri G. Busignies, Forest Hills, N. Y., assignor to International Standard Electric Corporation, New York, N. Y., a corporation of Delaware Application March 5, 1941, Serial No. 381,839

9 Claims. (Cl. 343—13)

The present invention relates to methods and means for measuring distances by electromagnetic waves and more particularly to methods and apparatus for eliminating undesired indications produced by objects other than the object being studied.

Distance finding systems wherein pulses of electromagnetic waves are transmitted to a distant object, reflected by the object, received at the source from which they were emitted and applied to an indicator, are known. In these systems, pulses of electromagnetic waves are transmitted from a source and the time required for these pulses to travel to a reflecting object and to return, is measured. The time required is a measure of the distance of the reflecting object from the source.

The above systems are particularly adapted to the measurement of the distance of a moving object with respect to a stationary source. Such systems may, for example, be employed for the detection of the distance of aircraft from a ground station. However, when these systems have been employed for the detection of aircraft, it has been found that numerous indications are obtained, due to fixed objects near the ground station, and these indications have interfered with the observance of the aircraft. The reflections from the fixed objects are generally of high energy with respect to the reflections from the aircraft, and hence, the indication of the moving aircraft is obscured by the indications produced by the fixed objects.

It is an object of the invention to eliminate indications in distance finding systems, due to unimportant objects in the surveyed field.

It is another object of the present invention to provide means for reducing or substantially eliminating indications due to fixed objects in the surveyed or explored field.

In accordance with one embodiment of my invention, pulses of electromagnetic waves are emitted from a first antenna system, and the waves reflected from objects in the path of the emitted waves are received by a second antenna system. At least one of these antenna systems is directive, and preferably, both of the antenna systems are directive. The directive antenna system is rotated either through 360 degrees or in an arc determined by the field one wishes to explore, and when both antenna systems are directive, the systems are rotated in synchronism. The received waves are converted into controlling electrical impulses, which are combined with other electrical impulses of substantially the same wave form, but of opposite phase. The result of this combination is applied to a distance indicating device, which is preferably a cathode ray oscillograph. In some of the known systems, an impulse generator is used to regulate the output of the wave generator. In these systems, it is possible to obtain the impulses which are combined with the controlling electrical impulses, by means of a phase shifting or delay circuit connected between the impulse generator and the combining circuit. It is also possible to obtain the impulses which are combined with the controlling electrical impulses, by delaying a portion of the electrical impulses converted from the received waves, and to combine these delayed impulses with later impulses, which are not delayed. In accordance with a modification of this latter method, I provide a source of continuous high-frequency waves or voltages which are mixed with the controlling electrical impulses, and the result of this mixing process is applied to a separating, delaying and recombining stage.

My invention will be more clearly understood by referring to the following particular description made in connection with the accompanying drawings, wherein.

Figure 1:
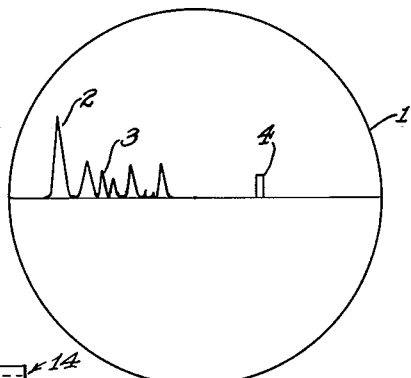
Fig. 1 illustrates a common indication obtained on cathode ray oscillographs employed in known distance finding systems.

In known systems for measuring the distance of an object by pulses of electromagnetic waves, the indications commonly obtained on the screen of a cathode ray oscillograph are illustrated by Fig. 1. The numeral 2 indicates a pulse for indicating the scale of distance which may be obtained by feeding some of the transmitted pulses from the transmitter to the receiver. These pulses are used to deflect the cathode ray of a cathode ray oscillograph in any well known manner. The pulses indicated by the numeral 3 are a series of pulses representing waves reflected from fixed objects near the transmitting source. Usually, these pulses are reflected from objects near the source, but they may also be reflected from objects which are at a considerable distance from the source. The pulse 4 is a pulse representing a wave reflected from an object which one desires to observe and this object may be either a fixed object or a moving object. The present invention is concerned primarily with emphasizing indications due to moving objects and suppressing indications due to fixed objects. The pulses 3 are not only distracting to the observer, but they also interfere with the observation of the pulse 4 as the moving object approaches the transmitting source.

Figure 2:
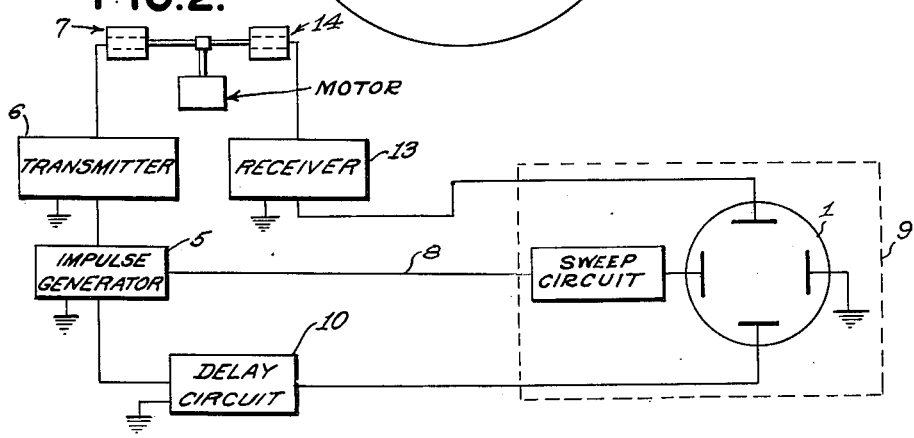
Fig. 2 illustrates distance finding apparatus provided with means for eliminating undesired indications on a distance indicator.

Fig. 2 shows a system for eliminating any, or all, of the pulses 3 shown in Fig. 1. The system comprises an impulse generator 5 which is part of the transmitter and is used for controlling the output of that portion 6 of the transmitter which supplies an antenna system 7. The receiver 13 connected to the antenna system 14 receives waves reflected from objects in the path of the waves radiated from the antenna system 7. Either, or both, of the antenna systems 7 and 14 may be directional. If both of the antenna systems are directional as indicated, the direction of maximum radiation of the antenna system 7 should be substantially parallel to the direction of maximum sensitivity of the antenna system 14, and the two antenna systems should be turned in synchronism. The antenna systems may be continuously rotated or turned through a small arc either manually or mechanically. If only one of the antenna systems is directive, this directive antenna system may be continuously rotated or turned manually or mechanically through a small arc. A line 8 supplies synchronizing voltages from the impulse generator 5 to the distance indicator 9 which is preferably a cathode ray oscillograph, containing a cathode ray tube having the usual deflection electrodes and intensity control elements, and an associated sweep circuit. The synchronizing voltages control the sweep circuit to produce a sweep line on the screen of the oscillograph. A delay circuit 10 is connected between the impulse generator 5 and the oscillograph 9 in opposition to the connection thereto of the receiver 13.

The delay, or phase shifting network 10, connected between the impulse generator 5 and the oscillograph 9, provides impulses of delayed phase to be combined with certain of the impulses at the output of the receiver 13. The delay introduced by the network 10 should be substantially equal to the time required for an impulse to leave the transmitter, travel to a reflecting object and be reflected to the receiver and the oscillograph, but the delay may be longer (a multiple thereof for example) if desired. The output of the retarding network 10 is connected to the oscillograph in opposition to the output of the receiver 13. The receiver 13 furnishes voltages, or currents, to the oscillograph for controlling the deflection of the cathode ray, and will normally produce indications on the cathode ray screen of the type shown in Fig. 1, if no impulses from the generator 5 are fed through the delay network 10, and combined with the pulses from the receiver 13. If the delay circuit 10 is connected to the oscillograph 9, in the manner outlined above, any of the pulses 3 shown in Fig. 1, may be removed or eliminated by suitably adjusting the delay produced by the network 10, for example by selecting the point at which the opposing delayed impulses are taken from the network. If it is desired to remove all of the impulses 3, then several connections may be made to the network 10, so that suitably delayed impulses may be obtained therefrom, which will oppose the incoming impulses 3.

Figure 3:
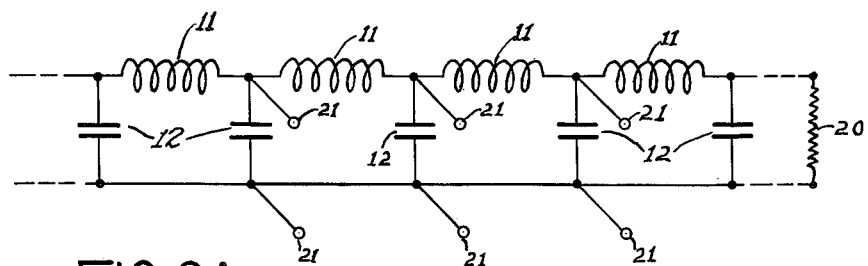
Fig. 3 illustrates schematically, a known type of delay circuit for use in connection with the apparatus of Fig. 2.

The delay network 10, shown in Fig. 2, may be an artificial line, or other type of network. One example of the type of network which may be employed is illustrated in Fig. 3. As shown in Fig. 3, the network can comprise a plurality of inductances 11 in series with each other, and a plurality of capacities 12 connected in shunt therewith. The impedance 20 is a terminating impedance and is equal to the characteristic impedance of the line. The delay network may, of course, be constructed with any other well known manner. The output of the delay network may be taken from any, or all, of the terminals 21.

Figure 3A:
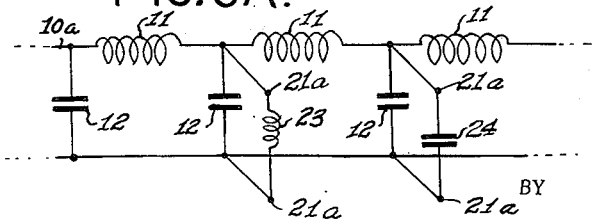
Fig. 3A illustrates schematically a modified form of the delay circuit shown in Fig. 3.

Since it is comparatively difficult to construct a delay network for the above arrangement which will have a sufficient time delay and since each output circuit connected to the various tapping points on the delay network must be provided with a special network to prevent reflections in the network, I prefer to obtain the delayed impulses in a different manner. I show this modification in Fig. 3A. The oscillograph 9 is connected to the input 10a of the network, and impedances 23 and 24 which may be other than those shown are connected to the terminals 21a. The impedances 23 and 24 produce reflections in the network 10 which are transmitted as echoes to the input 10a of the network. These echoes are conveyed to the oscillograph 9 and are used to oppose the impulses produced by waves reflected from fixed objects. It is obvious that the time delay of an echo from a point in a line is approximately equal to twice the time delay of the original impulse produced by the impulse generator at that point.

In either of the above delay networks, amplifiers may be included similar to the manner in which repeaters are included in a telephone line to regulate the amplitude of the delayed impulses. If amplifiers are employed in the modification utilizing network echoes, the amplifiers should be two-way amplifiers.

Figure 4:
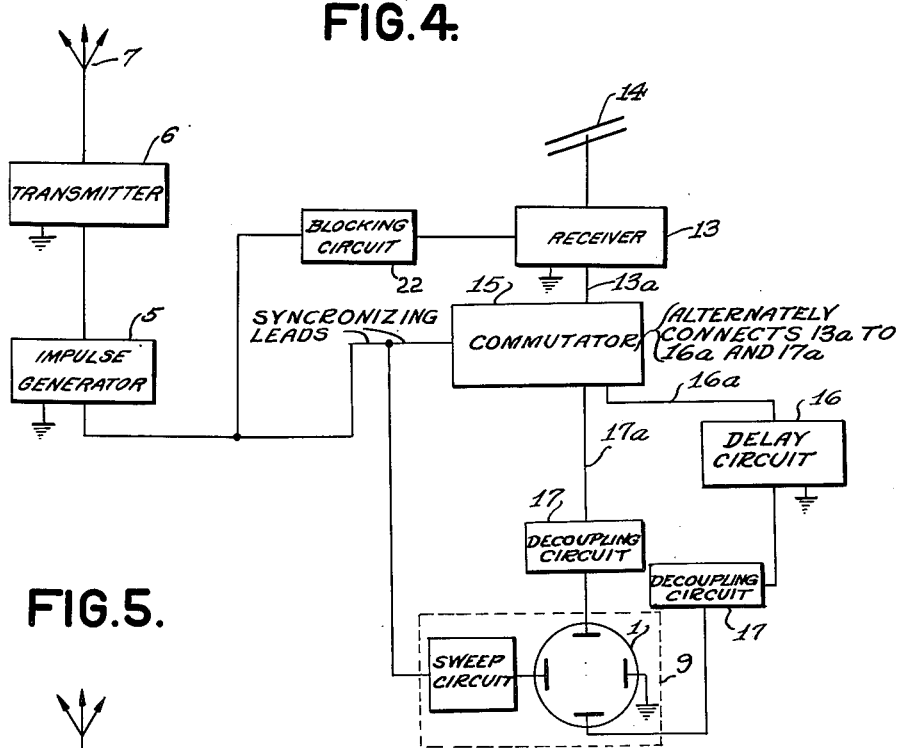
Fig. 4 illustrates schematically, distance finding apparatus provided with means for eliminating undesired indications on a distance indicator.

According to another embodiment of the invention, means are provided for retarding a portion of the transmitted impulses after they are received, and for combining these impulses with other impulses which have not been retarded, in such a manner that the impulses due to waves reflected from fixed objects, are substantially eliminated. In Fig. 4, I have shown a system for retarding a portion of the received waves, or the impulses due to these waves, and for combining the retarded impulses with unretarded impulses in such a manner that only pulses due to reflections from moving objects appear on the oscillograph screen. In this figure, a transmitter 6 controlled by an impulse generator 5, supplies an antenna system 7. Reflected waves from objects in the path of the transmitted waves, are received by the antenna system 14, and converted into controlling electrical impulses by the receiver 13. As in the embodiment shown in Fig. 2, either, or both of the antenna systems 7 and 14, may be directive, and the directive antenna system, or systems, is turned or rotated as previously explained. A blocking circuit 22 has been shown connected between the impulse generator 5 and the receiver 13. The purpose of the blocking circuit 22 is to desensitize the receiver 13 during transmission of pulses from the transmitter 6 and antenna system 7. Such a blocking circuit may also be employed with the system shown in Fig. 2. If desired, this blocking circuit may be omitted, but in the preferred arrangement, a blocking circuit is included, since pulses transmitted directly from the transmitter to the receiver are very strong and may block out the reflected waves. The impulse generator 5 is also coupled to the sweep circuit of the cathode ray tube oscillograph 9 in order to synchronize the sweep circuit with the impulse generator. The sweep circuit may have a sweep frequency equal to the frequency of the impulses, or some submultiple of the pulse frequency.

The selector, or commutator 15, with its associated delay circuit 16 and decoupling circuits 17, is connected between the receiver 13 and the other deflecting electrodes of oscillograph 9. The commutator 15 is arranged to be synchronized with the impulse generator 5. If the delay circuit 16 has a time delay equal to the time between similar portions of the impulses at the frequency of the transmitted waves, then the commutator may be constructed to reverse its transmission with each pulse. Preferably, however, the rate of switching of the commutator 15 should be equal to the sweep frequency rate and the delay circuit should be adjusted accordingly. The sweep frequency may be equal to the pulse frequency or some sub-multiple thereof, and in the preferred embodiment the sweep frequency equals the pulse frequency. The output of the delay circuit 16 is connected so that the impulses from the output of the delay circuit are in opposition to the impulses from the output of the direct circuit between the commutator 15 and the oscillograph 9. The decoupling circuits 17 are provided to decouple the delay circuit from the direct circuit, and may be of any known type.

Suppose that a short pulse of waves is set out from the transmitter, reflected from fixed and moving objects in its path as several pulses and received at the receiver 13. In the receiver the reflected waves are converted into controlling pulses which appear at the output of the receiver in the form shown in Fig. 1. If at the time the pulses appear at the output of the receiver the commutator is in the proper position, the pulses will be transmitted to the delay circuit 16. Suppose, as in the preferred embodiment, the sweep frequency, transmitted pulse frequency and switching or commutating frequency are all substantially equal. Then, on the transmission of the second pulse of waves from the receiver, the commutator will change to a new position such that when the reflected pulses of waves due to the second transmitted pulse are received and converted they will be transmitted along the direct circuit between the commutator and the oscillograph. If delay circuit is properly adjusted, the portion of the first pulses which were transmitted to the delay circuit and corresponding to reflections from fixed objects will reach the oscillograph at the same time as the portion of the second pulses which were transmitted along the direct circuit and corresponding to the reflections from fixed objects, and since the output of the delay circuit is connected in opposition to the output of the direct circuit at the oscillograph, the pulses due to reflections from fixed objects will cancel provided they are of similar wave form and amplitude. During the interval between the first and second transmitted impulses, a moving object will have moved a short distance. Therefore, except in the case where the object moves on the circumference of a circle having its center at the transmitter, the position of the pulse with respect to time reflected from this moving object will be different in the set of pulses transmitted along the direct circuit from that in the set of pulses transmitted to the delay circuit, that is, if the object is moving away from the transmitter, its position will be later and vice versa. In practice this difference of position is very small, and the pulses corresponding to reflections from moving objects from both circuits will almost cancel and produce but two small peaks on the oscillograph separated by the width of a pulse minus the relative phase displacement. Of course, if a delay circuit having a very long time delay, say five or six pulses, can be provided, a better indication may be obtained for the pulses will have a greater phase displacement and will produce peaks of a larger amplitude.

In some cases, the delay circuit 16 may be a simple, artificial line, of the type shown in Fig. 3. In other cases where a considerable delay is desired, it may be necessary to resort to mechanical delay circuits or circuits employing the delay of supersonic or sonic waves in space between a transmitter and receiver. These latter circuits are well known, and require no detailed description.

Figure 5:
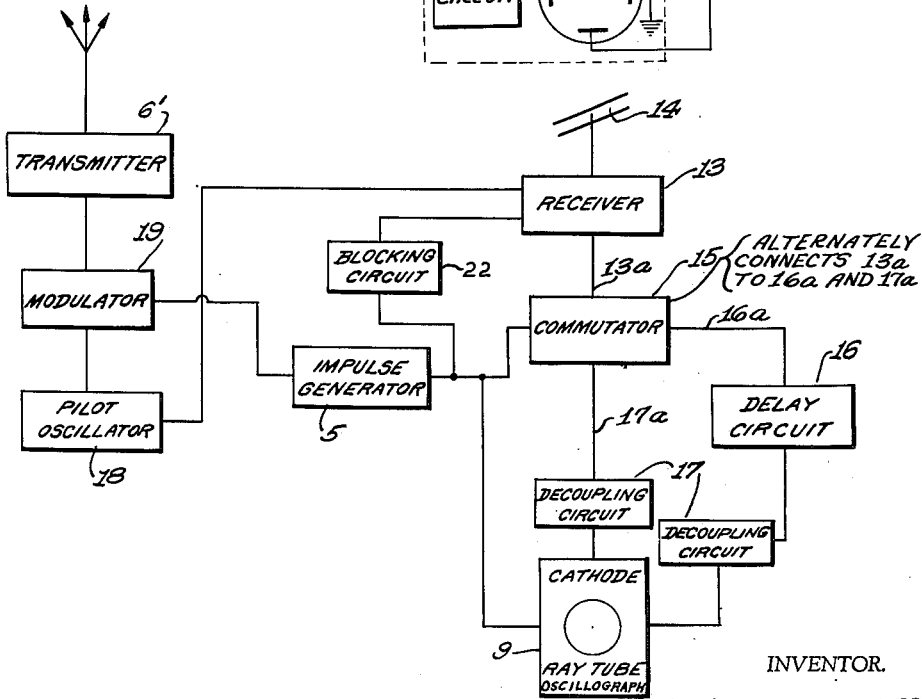
Fig. 5 illustrates schematically, a modification of the systems shown in Fig. 4.

In order to overcome the difficulty of providing a delay circuit 16, having a fairly large time delay at the frequency of transmission, it is possible to employ a system of the type illustrated in Fig. 5. In Fig. 5, the apparatus shown corresponds substantially to the apparatus shown in Fig. 4. In addition to the apparatus of Fig. 4, there is shown in Fig. 5, additional transmitter equipment. This additional transmitter equipment comprises a modulator 19 and a pilot oscillator 18. This additional equipment may, of course, have been included in the transmitter 6, shown in Fig. 4, but, in Fig. 5, they have been separated from the transmitter to show an additional use to which they may be put. The operation of the system of Fig. 5 is substantially the same as the operation of the system of Fig. 4. In the system of Fig. 5, continuous waves from the pilot oscillator 18, which is a very stable oscillator, preferably quartz crystal controlled, is coupled to the receiver 13. The energy from the pilot oscillator 18 is combined with the energy produced in the receiver by the reflected waves. This combination of the two energies produces impulses of an amplitude varying at a frequency determined by the speed of the moving object and impulses of a constant amplitude corresponding to reflections from fixed objects. All of these impulses are supplied to the commutator 15, delay circuit 16 and decoupling circuits 17. The output from the direct circuit from the commutator 15, and from the delay circuit 16, is opposing pulses of varying amplitude and opposing pulses of constant amplitude. When these pulses are combined in opposition as before and applied to the oscillograph, a peak of varying amplitude will appear on the scale of distance. The position of this varying peak will indicate, with respect to the scale, the distance of the moving object from the transmitting source, and the rate of variation of the amplitude of the peak will give an indication of the speed of the moving object, with respect to the source.

This last mentioned system shown in Fig. 5 has the advantage that indications due to reflections from moving objects are substantially improved with a decrease in the complexity of the delay circuit from the type of delay circuit required to produce similar indications. As pointed out in connection with Fig. 4, the indication produced on the oscillograph (when the delay circuit 16 has a time delay substantially equal to the time between successive pulses) by successive pulses corresponding to waves reflected from moving objects is two peaks of small amplitude. In the last mentioned system the pulses corresponding to waves from moving objects vary not only in time position with respect to the sets of pulses supplied to the direct circuit and the delay circuit but also in amplitude with each successive pulse. This means that the indication on the oscillograph for moving objects will consist of the combination of two pulses of unequal amplitude and displaced with respect to each other.

The commutator 15, delay circuit 16, and decoupling circuits 17, shown in Fig. 5, may be omitted. In this arrangement, the operation of the system is substantially the same as the operation described heretofore, in connection with resulting pulses produced by the mixing of waves reflected from fixed objects with waves reflected from moving objects. In the arrangement heretofore described, the resulting pulse, or pulses, was produced by mixing waves reflected from fixed objects, with waves reflected from moving objects. The waves from the fixed objects acted substantially the same as waves from another source. In the above modification of Fig. 5, another source, namely, pilot oscillator 18, is actually provided. With the commutator 15, delay circuit 16, and decoupling circuits 17 omitted, the receiver 13 may be connected directly to the oscillograph 9, instead of peak indications obtained by inclusion of these circuit elements, the combination of wave energy produces impulses of an amplitude varying at a frequency determined by the speed of the moving object and impulses of a constant amplitude corresponding to reflections from fixed objects.

Instead of a commutator 15, as shown in Figs. 4 and 5, two receivers may be connected to the antenna system 14. The output of one of these receivers would be connected directly to the oscillograph 9, and the other of these receivers would be connected by means of a delay circuit to the oscillograph 9. However, in order to reduce the amount of equipment necessary, I have provided a switching, or commutating circuit 15, which may be either an electrical or mechanical switching circuit.

While I have described particular embodiments of my invention for purposes of illustration, it will be understood that various modifications and adaptations thereof may be made within the scope of the invention.

What is claimed is:

1. Distance indicating apparatus comprising a generator of pulses of electromagnetic waves of a given repetition frequency, means coupled to s. generator for radiating said waves, means for receiving waves reflected from fixed and moving objects in the path of said radiated waves, means for converting said received waves into first electrical impulses, means coupled to said generator for producing from pulses supplied from said generator second electrical pulses of said given repetition frequency and substantially opposite in phase with said first impulses, means for combining selected of said first impulses derived from the fixed reflecting objects with said second impulses said combining means having an output, indicating means, and means for coupling the output of said combining means to said indicating means.

2. Distance indicating apparatus according to claim 1 wherein said means for producing second electrical impulses comprises said generator and a phase shifting network to retard the impulses received from said generator.

3. Distance indicating apparatus comprising a generator of pulses of electromagnetic waves having a predetermined frequency, a first antenna system coupled to said generator for radiating said waves, a second antenna system for receiving waves reflected from fixed and moving objects in the path of said radiated waves, at least one of said antenna systems being directive, a receiver for converting the received waves into electrical impulses, a cathode ray tube oscillograph comprising means for deflecting the ray of said tube, in a fixed predetermined relation to the frequency of the pulses of electromagnetic waves to produce a predetermined sweep, deflection electrodes adapted to produce deflections in said sweep, a phase shifting circuit connected to said electrodes, and means for alternately connecting the output of the receiver to said electrodes and to said phase shifting circuit whereby certain of the indications on said oscillograph due to electrical impulses converted from waves reflected by said objects are substantially eliminated.

4. Distance indicating apparatus according to claim 3 wherein said means for alternately connecting the output of said receiver to said electrodes and to said phase shifting circuit comprises a commutator, the switching time of said commutator being substantially equal to the delay time of said phase shifting circuit at the frequency of said electromagnetic waves.

5. Distance indicating apparatus according to claim 3 wherein both of said antenna systems are directive and are similarly oriented, and further comprising means for rotating said antenna systems in synchronism.

6. In a radio locator system, an indicator circuit, means for transmitting a radio wave to both stationary and moving wave reflecting objects, means for receiving the waves reflected from said objects, the waves reflected from the stationary objects recurring at said receiving means in an unchanging phase relation, and means for substantially cancelling out the received waves from said stationary objects and for supplying only the waves received from said moving objects to said indicator circuit.

7. In a radio locator system, an indicator means, means for transmitting a radio wave to both stationary and moving wave reflecting objects, means for receiving the waves reflected from said objects, the waves reflected from the stationary objects recurring at said receiving means in an unchanging phase relation, and means for substantially cancelling out the received waves from said stationary objects and for supplying only the waves received from said moving objects to said indicator means.

8. Distance indicating apparatus comprising a generator of pulses of electromagnetic waves, means coupled to said generator for radiating said waves, means for receiving said waves reflected from objects in the path of said radiated waves, means for converting said received waves into first electrical impulses, means coupled to said generator for producing second electrical impulses of the same frequency and substantially opposite in phase with said first impulses, means for combining at least a portion of said impulses, said combining means having an output, indicating means and means for coupling the output of said combining means to said indicating means, said means for producing second electrical impulses comprising a commutator and a phase shifting network connected between said converting means and said combining means.

9. Distance indicating apparatus comprising a generator of pulses of electromagnetic waves, means coupled to said generator for radiating said waves, means for receiving said waves reflected from objects in the path of said radiated waves, means for converting said received waves into first electrical impulses, means coupled to said generator for producing second electrical impulses of the same frequency and substantially opposite in phase with said first impulses, means for combining at least a portion of said impulses, said combining means having an output, indicating means and means for coupling the output of said combining means to said indicating means, said generator comprising an oscillator for producing continuous high frequency voltage and further comprising means for combining a portion of said voltage with first electrical impulses before said first impulses are combined with said second impulses.

HENRI G. BUSIGNIES.

REFERENCES CITED

The following references are of record in the file of this patent:

UNITED STATES PATENTS

| Number | Name | Date |
|---|---|---|
| 2,143,035 | Smith | Jan. 10, 1939 |
| 2,207,267 | Plaistowe | July 9, 1940 |
| 2,223,224 | Newhouse | Nov. 26, 1940 |
| 2,227,057 | Blumlein | Dec. 31, 1940 |
| 2,231,929 | Lyman | Feb. 18, 1941 |
| 2,310,692 | Hansell | Feb. 9, 1943 |

FOREIGN PATENTS

| Number | Country | Date |
|---|---|---|
| 480,572 | Great Britain | Feb. 24, 1938 |